(12) United States Patent  (10) Patent No.: US 8,689,007 B2
Schunter et al.  (45) Date of Patent: *Apr. 1, 2014

(54) INTEGRITY PROTECTION IN DATA PROCESSING SYSTEMS

(75) Inventors: Matthias Schunter, Zurich (CH); Axel Tanner, Kilchberg (CH); Bernhard Jansen, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 779 days.

This patent is subject to a terminal disclaimer.

(21) Appl. No.: 12/054,860

(22) Filed: Mar. 25, 2008

(65) Prior Publication Data

US 2008/0235534 A1  Sep. 25, 2008

Related U.S. Application Data

(63) Continuation of application No. 12/020,612, filed on Jan. 28, 2008.

(30) Foreign Application Priority Data

Mar. 22, 2007 (EP) .................................... 07104704

(51) Int. Cl.
  *G06F 21/00* (2013.01)
(52) U.S. Cl.
  USPC .............. 713/189; 713/190; 726/22; 711/163
(58) Field of Classification Search
  USPC .................... 713/189, 190, 193, 194; 726/22; 711/163
  See application file for complete search history.

(56) References Cited

U.S. PATENT DOCUMENTS

| 5,388,244 | A | * | 2/1995 | Brent et al. | 711/208 |
|---|---|---|---|---|---|
| 5,479,628 | A | * | 12/1995 | Olson et al. | 711/206 |
| 6,549,959 | B1 | * | 4/2003 | Yates et al. | 710/22 |
| 6,643,731 | B2 | * | 11/2003 | Lu et al. | 711/103 |
| 6,708,274 | B2 | * | 3/2004 | Herbert et al. | 713/190 |
| 6,854,039 | B1 | * | 2/2005 | Strongin et al. | 711/163 |
| 6,986,006 | B2 | * | 1/2006 | Willman et al. | 711/152 |
| 6,986,052 | B1 | * | 1/2006 | Mittal | 713/190 |
| 7,010,684 | B2 | * | 3/2006 | DeTreville | 713/159 |

(Continued)

OTHER PUBLICATIONS

Liang, Shuang; Noronha, Ranjit; Panda, Dhabaleswar K.; "Swapping to Remote Memory over InfiniBand: An Approach using a High Performance Network Block Device", IEEE International Cluster Computing, Sep. 2005, pp. 1-10.*

(Continued)

*Primary Examiner* — Victor Lesniewski
(74) *Attorney, Agent, or Firm* — Cantor Colburn LLP

(57) ABSTRACT

A method for protecting the integrity of a set of memory pages to be accessed by an operating system of a data processing system, includes running the operating system in a virtual machine (VM) of the data processing system; verifying the integrity of the set of memory pages on loading of pages in the set to a memory of the data processing system for access by the operating system; in response to verification of the integrity, designating the set of memory pages as trusted pages and, in a page table to be used by the operating system during the access, marking non-trusted pages as paged; and in response to a subsequent page fault interrupt for a non-trusted page, remapping the set of pages to a region of the data processing system memory which is inaccessible to the virtual machine.

13 Claims, 3 Drawing Sheets

(56) References Cited

U.S. PATENT DOCUMENTS

| | | | |
|---|---|---|---|
| 7,082,507 B1* | 7/2006 | Christie et al. | 711/163 |
| 7,149,901 B2* | 12/2006 | Herbert et al. | 713/190 |
| 7,178,068 B2* | 2/2007 | Maison et al. | 714/45 |
| 7,225,351 B2* | 5/2007 | Kimura et al. | 713/324 |
| 7,409,536 B2* | 8/2008 | Guo et al. | 713/1 |
| 7,496,769 B2* | 2/2009 | Lampson et al. | 713/193 |
| 7,496,966 B1* | 2/2009 | McGrath et al. | 726/27 |
| 7,627,734 B2* | 12/2009 | Wilson | 711/206 |
| 7,757,035 B2* | 7/2010 | Durham et al. | 711/6 |
| 7,810,092 B1* | 10/2010 | van Rietschote et al. | 718/1 |
| 7,814,287 B2* | 10/2010 | Pratt | 711/163 |
| 7,870,336 B2* | 1/2011 | Erlingsson et al. | 711/118 |
| 7,873,770 B2* | 1/2011 | Hummel et al. | 710/266 |
| 7,882,318 B2* | 2/2011 | Savagaonkar et al. | 711/163 |
| 8,108,641 B2* | 1/2012 | Goss et al. | 711/163 |
| 8,396,214 B2* | 3/2013 | Helfman et al. | 380/44 |
| 2002/0166053 A1* | 11/2002 | Wilson | 713/189 |
| 2003/0188169 A1* | 10/2003 | Strongin et al. | 713/181 |
| 2003/0200402 A1 | 10/2003 | Willman et al. | |
| 2007/0011431 A1* | 1/2007 | Hogdal et al. | 711/207 |
| 2007/0055837 A1 | 3/2007 | Rajagopal et al. | |
| 2007/0067590 A1* | 3/2007 | Savagaonkar et al. | 711/163 |
| 2007/0226795 A1* | 9/2007 | Conti et al. | 726/22 |
| 2007/0294494 A1* | 12/2007 | Conti et al. | 711/158 |
| 2007/0294496 A1* | 12/2007 | Goss et al. | 711/163 |
| 2008/0077767 A1* | 3/2008 | Khosravi et al. | 711/216 |
| 2008/0082772 A1* | 4/2008 | Savagaonkar et al. | 711/163 |
| 2008/0201540 A1 | 8/2008 | Sahita et al. | |
| 2012/0147937 A1* | 6/2012 | Goss et al. | 375/222 |

OTHER PUBLICATIONS

Petrov, Peter; Tracy, Daniel; Orailoglu, Alex; "Energy-Efficient Physically Tagged Caches for Embedded Processors with Virtual Memory", Proceedings of the 42$^{nd}$ Design Automation Conference, Jun. 13-17, 2005, pp. 17-22.*

Chu, Rui; Xiao, Nong; Zhuang, Yongzhen; Liu, Yunhao; Lu, Xicheng; "A Distributed Paging RAM Grid System for Wide-Area Memory Sharing", 20$^{th}$ International Parallel and Distributed Processing Symposium, Apr. 25-29, 2006, 10 pages.*

Moshnyaga, Vasily G.; Vo, Hua; Reinman, Glenn; Potkonjak, Miodrag; "Reducing Energy of DRAM/Flash Memory System by OS-controlled Data Refresh", IEEE International Symposium on Circuits and Systems, May 27-30, 2007, pp. 2108-2111.*

* cited by examiner

INTEGRITY PROTECTION IN DATA PROCESSING SYSTEMS

This application is a continuation application of U.S. Ser. No. 12/020,612 filed Jan. 28, 2008, which claims priority to European Patent Application No. 07104704.7, filed 22 Mar. 2007, and all the benefits accruing therefrom under 35 U.S.C. §119, the contents of which in its entirety are herein incorporated by reference.

BACKGROUND

The present invention relates generally to integrity protection in data processing systems and, more particularly, to a method, computer storage medium and data processing system for protecting the integrity of code or data which will be accessed by an operating system of a data processing system.

In data processing systems, from industrial or commercial computing systems to personal computers and everyday devices such as mobile phones, mechanisms are incorporated to protect system security. Malicious code such as viruses or Trojan horses, for example, can negatively impact the security of a system by injecting code into the computing base that is assumed to be trusted by a user. The operating system (OS) in a data processing system provides an interface between application processes running on the OS and the underlying system hardware. Isolation of the memory used by different processes is normally guaranteed by the OS. Protection of the code or data of a given process from tampering by another process is thus dependent on the security of the OS. Since the OS can access all process memory, malicious code which acquires privileges through infection of the OS can access the process memory of any resident process. In this way malicious code could tamper with intrusion detection mechanisms such as virus scanners which are intended to protect the system against attack. It is therefore a challenge for an OS to reliably defend its resident processes against an attack from inside the OS itself.

In the basic operation of an OS controlling the use of memory in a data processing system, each process running on the OS typically operates in its own virtual memory space, whereby the process uses a set of virtual memory addresses for all code or data to be accessed in the running of that process. The OS keeps track of the real memory location of each addressable section, or page, of the virtual memory space by way of a page table. This page table records the mapping between virtual addresses of resident processes and real addresses in the physical memory of the system. The page table typically also holds auxiliary information about each memory page. For instance, the memory management operations of the OS typically include moving pages between primary memory, typically relatively faster, volatile memory such as RAM, and secondary memory, typically slower, nonvolatile storage such as a hard disk. Unused pages in primary memory can be moved (or paged) to secondary memory, and the primary memory space allocated to another process. Each page table entry thus includes a flag known as a paged bit which can be set by the OS to indicate whether the associated page is present in primary memory or not.

An attempt to access a memory page which has been paged to secondary storage will result in a page fault interrupt being generated by the system hardware when the page is not found in primary memory. In response, the OS will retrieve the page from secondary memory and repeat the access process. The storage and movement of pages in physical memory is thus managed by the OS on behalf of each resident process which sees only its own virtual address space. Whenever a process calls for access to a given virtual address, the OS will access the memory page at the corresponding physical address recorded in the page table. It is this mapping of virtual to physical address space by the OS that normally restricts a given process from overwriting the memory pages of another process. As explained above, however, this isolation of process memory does not protect processes against internal attack through contamination of the OS itself.

Various schemes are known which provide some level of security against malicious tampering in data processing systems. Many schemes involve some form of integrity verification process whereby the integrity of given code or data can be verified prior to some operation being performed. This is often part of a process of attestation, whereby integrity of all or part of a system is demonstrated to a verifier by proving that there have been no unauthorized changes. Such an attestation process forms part of the functionality of the Trusted Platform Module (TPM) defined by the Trusted Computing Group, an organization created to develop and promote open industry standards for trusted computing. The TPM is defined in detail in Trusted Computing Group, TPM v1.2 Specification Changes (A Summary of Changes with respect to the v1.1b TPM Specification), October 2003. The TPM is a dedicated integrated circuit which provides secure storage for digital keys, certificates etc., as well as functionality for various security-related operations such as attestation. The attestation process involves generation of cryptographic checksums, or hash values, from measurements of hardware and software configurations in a system at boot-time and on subsequent configuration changes. These values can be supplied to a verifier when required and compared with known values for a trusted system to verify that system integrity is intact. The Integrity Measurement Architecture (IMA), Design and Implementation of a TCG-based Integrity Measurement Architecture, 13th Usenix Security Symposium, San Diego, Calif., August, 2004, similarly implements secure hardware in the form of a TPM-like chip for the detection of unauthorized modifications in a system during boot-time.

The IMA scheme again uses computation and secure storage of hash values of all loaded executables, whereby a verifier can later ask for signed hash values and determine whether the executables are unmodified. The TCG and IMA schemes thus use dedicated hardware support for secure attestation processes. A purely software-based system for attestation of memory contents is disclosed in "SWATT: Software-based Attestation for Embedded Devices", Seshadri et al.

This system uses the challenge of a remote verifier in a pseudo-random memory traversal operation with an iterative checksum update. The resulting checksum value is returned to the verifier to attest the memory contents.

Some approaches to system security involve providing a security protection mechanism outside of the normal OS of a system. An example is disclosed in "OS Independent Runtime System Integrity Services". This is a firmware-based approach in which an integrity measurement mechanism performs various security checks, including integrity verification of critical sections of memory, in an isolated execution environment contained within the system. Other approaches exploit virtual machine monitor (VMM) technology to provide isolation from the OS. A VMM is a layer of software that runs directly on the hardware of a system, presenting an abstraction of the hardware so that the presence of the VMM is transparent to the OS. The VMM virtualizes all hardware resources, allowing the system to be logically partitioned into separate virtual machines (VMs). Through operation of the VMM multiple virtual machines, each with their own OS, can run independently of one another, multiplexing the same underlying hardware resources. An example of a security scheme employing VMM technology is disclosed in "A Virtual Machine Introspection Based Architecture for Intrusion Detection", Garfinkel et al. Here, a VMM provides a substrate that isolates an intrusion detection system (IDS) from a virtual machine running the OS, and its resident applications, to be monitored. By inspecting the VM from outside, the IDS implements various security measures including integrity verification procedures involving checking hash values of memory pages corresponding to resident applications of the OS. Another example is disclosed in "Terra: A Virtual Machine-Based Platform for Trusted Computing", Garfinkel et al.

Here, a trusted VMM isolates multiple VMs which can be run as either "open-box" or "closed box" machines. A TPM-like chip provides hardware support for various security measures to protect closed-box VMs including integrity verification of memory pages by checking hash values.

While the above security schemes offer some form of integrity verification process, it is desirable to provide improved mechanisms for protecting integrity of code or data in data processing systems.

SUMMARY

The foregoing discussed drawbacks and deficiencies of the prior art are overcome or alleviated, in an exemplary embodiment, by a method for protecting the integrity of a set of memory pages to be accessed by an operating system of a data processing system, including running the operating system in a virtual machine (VM) of the data processing system; verifying the integrity of the set of memory pages on loading of pages in the set to a memory of the data processing system for access by the operating system; in response to verification of the integrity, designating the set of memory pages as trusted pages and, in a page table to be used by the operating system during the access, marking non-trusted pages as paged; and in response to a subsequent page fault interrupt for a non-trusted page, remapping the set of pages to a region of the data processing system memory which is inaccessible to the virtual machine (VM).

In another embodiment, a computer storage medium includes computer readable instructions that, when executed by a computer, implement a method for protecting the integrity of a set of memory pages to be accessed by an operating system of a data processing system, the method further including running the operating system in a virtual machine (VM) of the data processing system; verifying the integrity of the set of memory pages on loading of pages in the set to a memory of the data processing system for access by the operating system; in response to verification of the integrity, designating the set of memory pages as trusted pages and, in a page table to be used by the operating system during the access, marking non-trusted pages as paged; and in response to a subsequent page fault interrupt for a non-trusted page, remapping the set of pages to a region of the data processing system memory which is inaccessible to the virtual machine (VM).

In still another embodiment, a data processing system has an operating system, a memory for storing memory pages to be accessed by the operating system in operation, and a virtual machine controller for protecting the integrity of a set of the memory pages, the virtual machine controller being adapted for running the operating system in a virtual machine (VM); verifying the integrity of the set of memory pages on loading of pages in the set to the memory for access by the operating system; in response to verification of the integrity, designating the set of memory pages as trusted pages and, in a page table to be used by the operating system during the access, marking non-trusted pages as paged; in response to a subsequent page fault interrupt for a non-trusted page, remapping the set of pages to a region of the memory which is inaccessible to the virtual machine (VM).

BRIEF DESCRIPTION OF THE DRAWINGS

Referring to the exemplary drawings wherein like elements are numbered alike in the several Figures.

DETAILED DESCRIPTION

Figure 1:
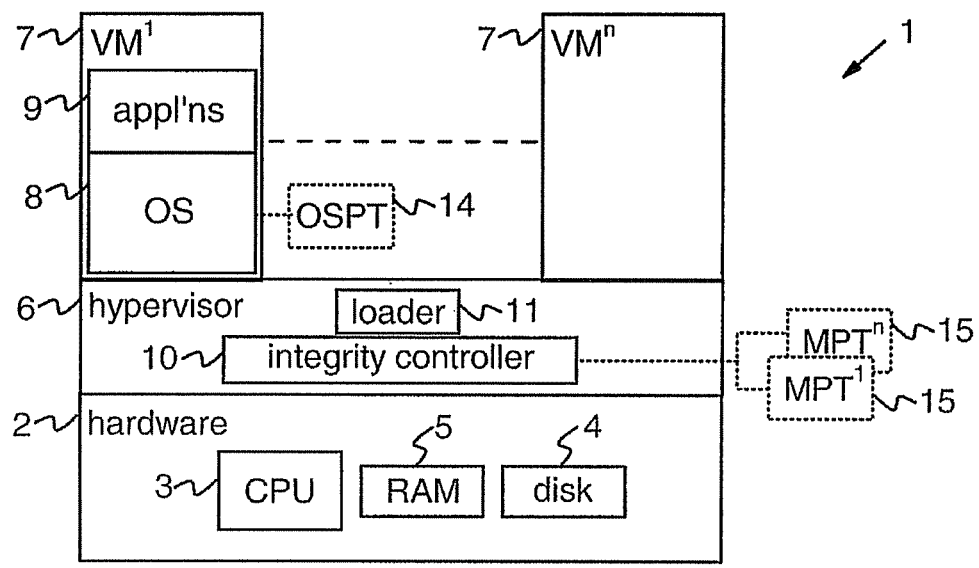
FIG. 1 is a schematic representation of a data processing system, in accordance with an exemplary embodiment of the invention.

Disclosed herein is a method for protecting the integrity of a set of memory pages to be accessed by an operating system of a data processing system. Briefly stated, the method includes:

running the operating system in a virtual machine of the data processing system;

verifying the integrity of the set of memory pages on loading of pages in the set to a memory of the data processing system for access by the operating system;

in response to verification of the integrity, designating the set of memory pages as trusted pages and, in a page table to be used by the operating system during the access, marking non-trusted pages as paged; and in response to a subsequent page fault interrupt for a non-trusted page, remapping the set of pages to a region of the data processing system memory which is inaccessible to the virtual machine.

The set of memory pages may in general comprise one or more pages containing code or data to be protected, but will typically comprise a plurality of pages. For example, the set of memory pages may comprise all pages needed for running the security critical portions of a particular application to be protected in the system. In any case, an embodiment of the present invention provides protection for the code or data contained in the set of pages via a process of integrity verification coupled with a simpler scheme for effectively switching between trusted and untrusted modes of operation, with the set of memory pages being made inaccessible to the OS on moving from the trusted to untrusted mode. The OS is run in a virtual machine of the system, and when pages to be protected are loaded to memory for access by the OS (e.g., when an application is first loaded to primary memory), the integrity of the set of pages is verified.

Verification of the integrity results in the pages being designated as trusted, whereby the subsequent access to the pages (e.g., running of the application) effectively occurs in the trusted mode. The paged flags provided in the page table used by the OS during this access are exploited to ensure that only the integrity-verified, trusted pages can be accessed in the trusted mode, and hence the trusted pages are secure during trusted mode operation. In particular, non-trusted pages (i.e., any pages not designated as trusted) are marked as paged in the page table. This ensures that a page fault interrupt will be generated as soon as an attempt is made to access a non-trusted page. This occurrence effectively signifies the end of the trusted mode of operation, whereupon the set of pages to be protected are remapped to a memory region which is inaccessible to the virtual machine containing the OS. These pages cannot therefore be accessed by the OS in the subsequent untrusted operation mode, and the code or data in question is protected from tampering even if the OS becomes infected by malicious code.

The logical partitioning inherent in VM technology is thus exploited here to allow critical memory pages to be made inaccessible to the OS in the untrusted mode, and the paged flag mechanism is used to trigger the transition from the trusted mode, in which only integrity-verified pages can be accessed, to the untrusted mode. The trustworthiness of critical code or data can thus be done, even if the OS becomes contaminated, without specialized hardware or complex security mechanisms as in systems discussed above. Methods embodying the invention can be implemented in the context of a virtual machine monitor. Indeed, embodiments of the invention can be implemented without necessitating any changes to either the hardware or the basic OS of a data processing system. Overall, therefore, it will be seen that a relatively elegantly simple yet efficient scheme is provided for protecting the integrity of critical code or data in data processing systems compared to previously proposed techniques.

Depending on the particular set of memory pages to be protected, the integrity verification process may be performed on loading some or all pages in the set to memory. For example, where an application to be protected will use additional pages such as OS pages, libraries, etc., to run, the integrity of the entire set of memory pages needed by the application can be verified on loading of the application code to memory.

The page table used by the OS in the trusted mode may be the page table maintained by the OS in the normal way. In this case, the paged flags for the non-trusted pages can simply be reset on moving from the trusted to untrusted modes of operation. In certain exemplary embodiments of the invention, however, a mirror page table is maintained corresponding to the system page table maintained by the OS in operation. Here, the set of memory pages can be designated as trusted by marking each page as trusted in the mirror page table. Non-trusted pages are also marked as paged in the mirror page table. In these embodiments, the method includes the steps of (a) controlling the data processing system such that the mirror page table is used by the OS in the trusted mode, and (b) in response to a subsequent page fault interrupt for a non-trusted page, controlling the data processing system such that the OS reverts to use of the system page table. Here, therefore, the system switches between a mirror page table which is used in the trusted mode and the OS page table which is used in the untrusted mode. This will be described in more detail below.

If OS access to the protected pages, stored in the inaccessible memory region, is to be done subsequently, this can be identified and the needed pages remapped to OS-accessible memory as appropriate. For example, if a protected application is called again after an initial run, the entire set of pages can be remapped to an accessible memory region and the trusted mode entered as before. Thus, non-trusted pages will again be marked as paged in the page table used for the trusted mode, and a subsequent page fault interrupt for a non-trusted page will trigger exiting of the trusted mode and remapping of the set of pages back to the inaccessible region of system memory.

According to an embodiment of a second aspect of the present invention, there is provided a computer program comprising instructions for carrying out the steps of the method as described with reference to an embodiment of the first aspect of the present invention when the computer program is executed on a computer system. In the present context, the term "computer" is used in the most general sense and includes any device, component or system generally which has a data processing capability for implementing a computer program. Moreover, a computer program embodying the invention may comprise an independent program or may be an element of a larger program, and may be supplied, for example, embodied in a computer-readable medium such as a disk or an electronic transmission for loading in a computer system. The instructions of the computer program may comprise any expression, in any language, code or notation, of a set of instructions intended to cause a computer to perform the method in question, either directly or after either or both of (a) conversion to another language, code or notation, and (b) reproduction in a different material form.

According to an embodiment of a third aspect of the present invention, there is provided a data processing system having an operating system, a memory for storing memory pages to be accessed by the operating system in operation, and a virtual machine controller for protecting the integrity of a set of the memory pages. The virtual machine controller is adapted for:
  running the operating system in a virtual machine;
  verifying the integrity of the set of memory pages on loading of pages in the set to the memory for access by the operating system;
  in response to verification of the integrity, designating the set of memory pages as trusted pages and, in a page table to be used by the operating system during the access, marking non-trusted pages as paged;
  in response to a subsequent page fault interrupt for a non-trusted page, remapping the set of pages to a region of the memory which is inaccessible to the virtual machine.

In general, where features are described herein with reference to an embodiment of one aspect of the invention, corresponding features may be provided in embodiments of another aspect of the invention.

FIG. 1 is a schematic illustration of a data processing system 1, in accordance with an exemplary embodiment of the invention. In this exemplary embodiment, it is assumed that the data processing system 1 is a general purpose computer. The hardware base 2 of computer 1 thus includes the usual CPU 3 with hard disk 4, and a random access memory 5 for storing current memory pages in operation. Control logic in the form of a virtual machine controller, or hypervisor, 6 runs directly on top of the system hardware 2. While in general, the control logic could be implemented in hardware, software or a combination thereof, in this embodiment the hypervisor 6 is advantageously implemented entirely in software running directly on general purpose hardware 2.

The hypervisor 6 includes the functionality of a virtual machine monitor (VMM) discussed above. Thus, hypervisor 6 virtualizes the resources of hardware 2, logically partitioning these resources so that a plurality of virtual machines 7, represented schematically by $VM^1$ to $VM^n$ in the figure, can operate in isolation from one another on top of the hypervisor software. The hypervisor 6 thus has access to all states of the VMs 7 and receives all hardware and software interrupts occurring in operation of the VMs. As indicated for machine VM$^1$ in the figure, each virtual machine has its own guest operating system (OS) 8 and resident applications 9 supported by that OS. The hypervisor exports an abstraction of the underlying hardware to each virtual machine 7 such that operation of hypervisor 6 is transparent to the guest operating systems. Each machine OS 8 thus operates as normal, these operating systems collectively multiplexing the resources of hardware base 2 via the control functionality of the intervening hypervisor.

As well as the VMM functionality, hypervisor 6 includes logic for implementing a scheme for protecting the integrity of particular code or data associated with operation of individual VMs 7. Hypervisor 6 includes an integrity controller (IC) 10 providing the functionality for this scheme as described in detail below. In this particular embodiment, hypervisor 6 also includes loader logic 11 for loading applications from disk 4 to RAM 5 when called by an OS 8. Loader 11 operates generally as the loader logic in conventional systems but has additional functionality for interacting with IC 10 as described below. Suitable software for implementing the logic of hypervisor 6 will be apparent to those skilled in the art from the description herein.

As described earlier, in the normal running of an operating system the OS maintains a page table recording the mapping of virtual address space of its resident processes to physical memory. In system 1, each guest OS 8 thus maintains such a system page table (OSPT), indicated at 14 in FIG. 1 for VM$^1$, recording the mapping of each process' virtual address space to the memory area allocated to the VM by hypervisor 6. In addition, to facilitate implementation of the integrity protection scheme in this embodiment, integrity controller 10 maintains a mirror page table (MPT) for each VM as indicated at 15 in FIG. 1. As the name suggests, each mirror page table 15 generally mirrors the corresponding system page table 14, but it provides additional features, and is used slightly differently by hypervisor 6, for implementation of the integrity protection scheme.

Figure 2:
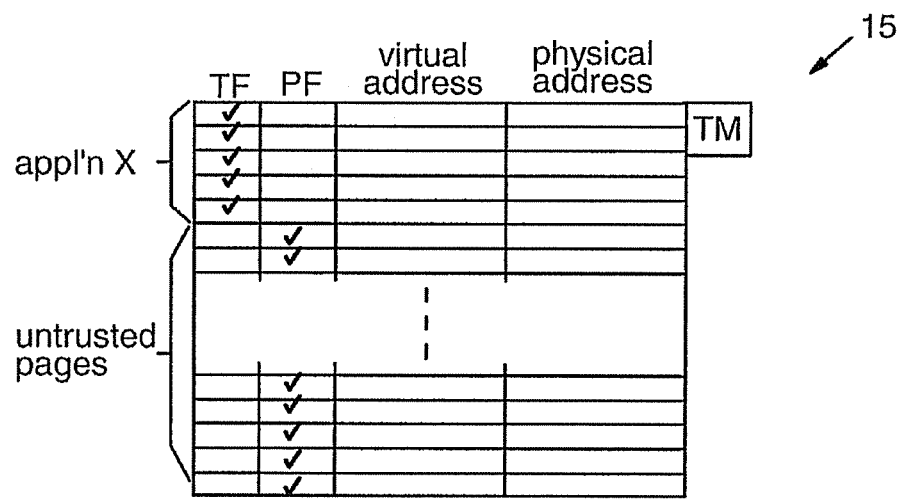
FIG. 2 is a schematic representation of a mirror page table used in the FIG. 1 system in a trusted mode of operation.

The features of the mirror page table used in operation of this embodiment are illustrated schematically in FIG. 2. As shown here, the mirror page table holds the virtual and physical memory address for each page, as well as a single-bit paged flag (PF) providing the paged marker for each entry. Each page is also provided with a trusted flag (TF) the function of which is explained below. In addition to maintaining mirror page table 15, integrity controller 10 maintains a trusted mode flag (TM) for each virtual machine 7 as indicated in the figure. The function of this flag TM is described below. Set bits are represented by ticks in this schematic drawing of the mirror page table. The configuration shown corresponds to a stage in operation where a protected application is about to run in a trusted mode of the virtual machine as explained hereinafter.

The following description of the integrity protection scheme will focus on operation of a single virtual machine VM$^1$, though the hypervisor provides similar functionality to all VMs 7 in the system. The integrity protection process will be described with reference to a particular guest application, application X, of VM$^1$ whose integrity is to be assured in operation of the system. However, the scheme can be applied for multiple protected applications, and in general for one or more sets of code or data identified in the hypervisor. To this end, the integrity controller 10 maintains a secure list of items to be protected in operation of the VM, the items in question being identified via any convenient property or identifier. Items can be registered with the IC 10 for entry on the list, for example via input of a system administrator or notification by an application itself if the application so provides. In operation, the IC 10 effectively switches between trusted and untrusted modes of VM operation depending on whether memory pages corresponding to registered items are to be accessed by the OS 8 of the VM. The particular way in which this is implemented to protect a registered application X will now be described with reference to FIGS. 3 to 5.

Figure 3:
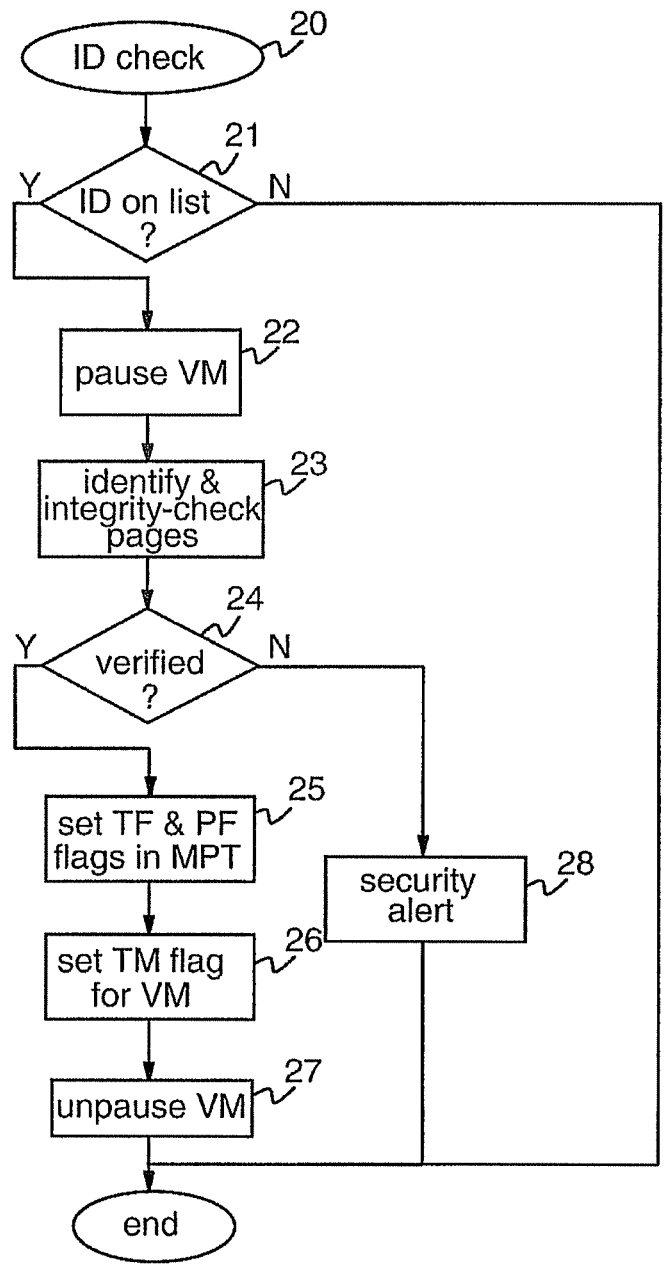
FIG. 3 illustrates steps performed in a virtual machine controller of the FIG. 1 system in preparation for running a protected application in the trusted mode.

The flow chart of FIG. 3 indicates the main steps performed by integrity controller 10 when application X is first loaded by the OS for execution in VM1. Loading of applications is handled by the OS 8 supported by loader 11 which loads the application from disk 4 to memory 5. As the application is loaded, page table entries are made by OS 8 in the system page table 14, and corresponding entries are made in the mirror page table 15 by IC 10 as described above. Loader 11 also supplies the application ID to integrity controller 10 for checking. Receipt of the application ID by controller 10 is represented by step 20 in FIG. 3. In response, controller 10 checks in step 21 whether the ID appears in the aforementioned list of registered items. If not, then no action is required by the IC 10 and the OS 8 can continue to run the application as normal. Assuming the application ID is registered with the IC as is the case for application X here, then operation proceeds to step 22. In this step, the IC 10 pauses the virtual machine VM$^1$. Next, in step 23 the IC identifies from the application header the complete set of memory pages that are needed by application X (i.e. library and OS pages as well as pages of the application code itself), and the integrity of these pages is then verified by the IC. In this embodiment, integrity is verified by hashing the pages in question using a predetermined hash algorithm and comparing the resulting hash value, calculated over the entire set of security-critical pages, to a trusted value known to the IC. Assuming the verification is determined to be successful in decision step 24, then operation proceeds to step 25 where the IC 10 updates the mirror page table 15. In particular, the integrity-verified pages are designated as trusted by setting the trusted flag TF for each of these pages in the mirror page table.

In addition, for all non-trusted, i.e. non-verified, pages in the page table, the IC sets the paged flag PF to mark these pages as paged out to disk. The resulting mirror page table configuration is thus as shown schematically in FIG. 2. In step 26, the IC then sets the trusted mode flag TM for VM$^1$, thereby indicating the start of a trusted mode of operation. Following this, the IC un-pauses the virtual machine in step 27, returning control to the application, and the initialization process is complete. Returning to step 24, a verification failure here would indicate unauthorized tampering with the code/data required by application X. Appropriate action can thus be taken in response to detection of the security breach. In this example, a security alert is issued by IC 10 to a system operator, and the initialization process then terminates without running of the protected application.

Once the trusted mode has been entered as described above, application X runs securely since all memory pages used by the application have been verified by the IC 10. For the application to have access to additional memory, this can be dynamically allocated by the IC, the additional pages being marked as trusted in the mirror page 15 table via the TF flags. While the TM flag is set for the VM, the hypervisor 6 controls system operation, by virtue of its intervention between the OS 8 and hardware 2, such that the mirror page table is used for all page table lookup operations of the OS 8. In other words, the hypervisor 6 effectively shows the mirror page table, through trusted operations, to the OS 8 in place of the system page table 14. This ensures that the IC will be alerted if the OS attempts to access a non-trusted page. In particular, since all non-trusted pages are marked as paged in the mirror page table, an attempt to access a non-trusted page will result in a page fault interrupt being generated by the system hardware. All page fault interrupts are received by hypervisor 6 in operation. Any page fault interrupt received by the hypervisor when the TM flag is set for the VM are delegated by the hypervisor to the IC 10. The subsequent operation of the IC 10 will now be explained with reference to FIG. 4.

Figure 4:
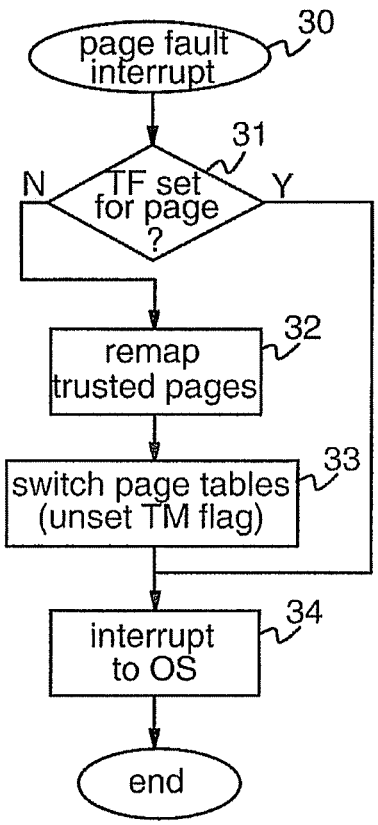
FIG. 4 illustrates steps performed by the virtual machine controller of the system on exiting the trusted mode.

Receipt of the page fault interrupt in the trusted mode is represented by step 30 in FIG. 4. In step 31, the IC checks the mirror page table 15 to determine if the trusted flag TF is set for the page in question. If so, then the interrupt is due to a trusted page having been paged out to disk. In this case, the process can proceed directly to step 34 whereupon the interrupt is passed to the OS 8. The page fault handler in the OS will then deal with the interrupt. The page will be retrieved from disk 4 to memory 5 and the page table, here mirror page table 15 currently in use for the trusted mode through the control enforced by hypervisor 6, updated accordingly. The paged flag will thus be reset for this page in the mirror page table, and operation will continue as normal in the trusted mode. Returning to step 31, if the trusted flag is not set for the page provoking the interrupt, this alerts the IC that operation is now leaving the trusted pages. In step 32 of the process the IC then remaps the set of trusted pages used by the application to a region of the RAM 5 which is inaccessible to the OS 8. That is, the trusted pages are remapped to a memory region which the VM$^1$ cannot access due to the logical partitioning enforced by hypervisor 6.

In this embodiment, IC 10 remaps the pages by moving them to the inaccessible memory area, the IC maintaining a record of the new location in any convenient manner, for example in the mirror page table 15. In step 33 of FIG. 4 the IC then unsets the trusted mode flag TM for VM$^1$ signifying a return to the untrusted mode of operation and switching of the page tables. Hypervisor 6 will thus revert to the control mode in which the normal system page table 14 is used by OS 8. Finally, in step 34, the IC passes the interrupt on to the OS 8 whereupon the address of the page will be located and normal operation will resume.

It will be seen that the above process ensures that application X runs securely in the trusted mode since only integrity-verified pages can be accessed in this mode. Once the application has terminated, the next page fault interrupt triggers reversion to the normal, untrusted mode after moving the trusted pages to a memory region inaccessible to the OS. These pages are thus safe from tampering by other processes in the untrusted mode, even in the event of contamination of the OS. Equally, an attempt to tamper with application X while the application is running will produce a page fault interrupt as the OS attempts to access the first untrusted page. This will trigger moving of the trusted pages outside of the OS-accessible memory region before any damage can be done.

Figure 5:
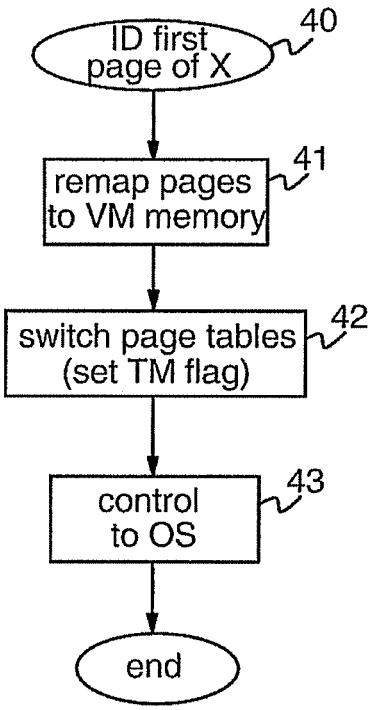
FIG. 5 illustrates steps performed by the virtual machine controller on reentering the trusted mode for a protected application.

When access to trusted pages in the inaccessible memory region is to be done again by the OS, the attempt to access the pages will be detected by the IC 10. The IC can then move the pages back into the VMs memory region and reenter the trusted mode as before. For example, the operation of IC 10 if application X is called again by OS 8 is indicated by the process of FIG. 5. When the first page of application X is called by the OS, more specifically by the process, a page fault interrupt will be generated by hardware 2 when the page is not found in memory. In response to the page fault interrupt, the IC checks whether the page in question is a trusted page by checking whether the TF flag is set for the page in mirror page table 15. If the page in question is identified as the first page of application X, step 40 in FIG. 5, then operation proceeds to step 41. Here, the IC retrieves the set of pages needed to run the application and stores them in an area of memory allocated to VM$^1$, updating the mirror page table 15 accordingly.

The remaining steps of the process are then essentially the same as steps 25 to 27 of FIG. 3 to initiate the trusted mode again and switch to use of the mirror page table. In particular, in step 42 the trusted mode flag TM for VM$^1$ is set, the page tables then being effectively switched so that the mirror page table will be used in the subsequent trusted operation. It is noted that the trusted flags TF for the relevant pages are already set from the previous run of application X. Similarly, the paged flags PF for non-trusted pages are still set in the mirror page table. Thus, where a mirror page table is employed, the step of marking non-trusted pages as paged on reentering the trusted mode is implicitly achieved simply by switching back to the mirror page table. Finally, the IC returns control to the OS in step 43. The process of reentering the trusted mode is then complete, and the application can run securely as before.

An embodiment of the present invention provides a relatively simpler, yet more efficient integrity protection scheme compared to previously-proposed techniques. Applications, or some specific data in memory including dynamic information such as cryptographic keys, can be protected against tampering by other processes and are even protected from the OS itself. No specialized hardware is required for operation of the scheme. Indeed, as in the exemplary embodiment described, the scheme can be implemented without necessitating any changes to either the hardware or the OS of the data processing system. The integrity verification process used in the scheme is event-driven, being triggered by use of a given piece of code or data, and the verification is based on the state in real memory, rather than the binary on disk. Hence, even in-memory-only modifications (e.g., caused by buffer overflow attacks) can be reduced.

While a specific exemplary embodiment has been described above, various alternatives and modifications are possible. Some examples will be described below.

The loader logic 11 in the above system provides a particularly convenient mechanism for engaging the IC 10 when a protected item is loaded to memory. This could, however, be achieved in other ways, e.g. by detailed checking and tracking of OS operation by the hypervisor, though this would have a negative impact on processing speed. The integrity verification process could also be performed in a variety of different ways as will be apparent to those skilled in the art. For instance, the IC could calculate and compare hashes pagewise for all pages in the set, or could request verification from an external verification entity (e.g., by supplying any convenient form of cryptographic checksum for validation by that entity).

If a user-facing application (e.g., an application with a password prompt) is to be protected in the system, some form of secure evidence could be provided that the application is indeed running in trusted mode. This could be achieved via a trusted user interface, such as a trusted window manager for indicating the mode through a specially decorated window frame. Suitable implementations here will be apparent to those skilled in the art.

While a mirror page table is ideally employed as in the example above, if there are insufficient resources for this in a system, then the scheme can be implemented by using the paged flags in the normal OS page table. For example, rather than a full mirror page table, the IC might simply maintain a list of all the trusted memory pages to be protected. Here, pages are thus designated as trusted pages by virtue of their presence on the list. On entering the trusted mode, the paged flags for all non-trusted pages would be set by the IC in the OS page table 14. In response to a subsequent page fault interrupt, the IC would check the list to determine if the page in question is a trusted page. If not, the IC knows operation is leaving the trusted pages and can remap trusted pages as before. The IC then resets all paged bits in the OS page table 14, and operation can continue in the untrusted mode. The TM flag for signifying the operative page table in the earlier embodiment, would not be used in this case.

While there are a plurality of VMs 7 in the exemplary embodiment described, in general one or more VMs may be defined by hypervisor 6. In particular, only a single VM may be defined in some systems, the logical partitioning functionality of hypervisor 6 nonetheless facilitating control of the memory accessible to this VM to support the remapping technique described above. In addition, while the IC functionality is provided within the hypervisor in the example described, the IC could in effect be contained within its own virtual machine running on the basic hypervisor software.

On exiting the trusted mode in the example above, the remapping of the set of pages to be protected is performed simply by moving the pages to a memory region which is inaccessible to the virtual machine. Alternatively, however, the remapping might be achieved by redefining the logical partitioning of memory in the hypervisor to remove the memory pages from the memory region allocated to the virtual machine. The partitioning could then be readjusted to make the pages accessible to the VM again when required.

Although the security scheme is implemented in a general purpose computer above, it will of course be appreciated that, in general, data processing systems embodying the invention may be other devices such as PDAs, mobile phones, servers, etc., and in general any data processing device, component or system in which an operating system supports some form of data processing capability.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for protecting the integrity of a set of memory pages to be accessed by an operating system of a data processing system, the method comprising:
    running the operating system in a virtual machine (VM) of the data processing system;
    verifying the integrity of the set of memory pages on loading of pages in the set of memory pages to a random access memory (RAM) of the data processing system for access by the operating system, wherein the RAM is disposed in the data processing system and is used for storing memory pages in operation;
    in response to verification of the integrity, designating one or more of the set of memory pages as a set of trusted pages and, in a page table to be used by the operating system during the access, marking one or more non-trusted pages as paged;
    in response to the verification of integrity, operating the operating system in a trusted mode of operation; and
    in response to the operating system attempting to access one of the non-trusted pages while operating in the trusted mode of operation, issuing a page interrupt for the non-trusted page and remapping the set of trusted pages to a portion of the RAM which is inaccessible to the VM during an untrusted mode of operation;
    wherein the page interrupt signals an end of the trusted mode of operation.

2. The method of claim 1, wherein the set of memory pages comprises the pages needed to run a predetermined application on the operating system.

3. The method of claim 1, further comprising:
    in response to the verification, marking the non-trusted pages as paged by setting respective paged flags in a system page table maintained by the operating system in operation; and
    in response to the page fault interrupt for a non-trusted page, resetting the paged flags for the non-trusted pages.

4. The method of claim 1, further comprising verifying the integrity of the set of pages by hashing the pages and comparing the resulting hash value to a predetermined trusted value.

5. The method of claim 1, further comprising, in response to initiation of a subsequent access by the operating system to the set of pages:
    remapping the set of pages to the portion of the RAM which is accessible to the virtual machine;
    marking non-trusted pages as paged in the page table to be used by the operating system during the access; and
    in response to a subsequent page fault interrupt for a non-trusted page, remapping the set of pages to the portion of the RAM which is inaccessible to the virtual machine.

6. A non-transitory computer storage medium comprising computer readable instructions that, when executed by a computer, implement a method for protecting the integrity of a set of memory pages to be accessed by an operating system of a data processing system, the method further comprising:
    running the operating system in a virtual machine (VM) of the data processing system;
    verifying the integrity of the set of memory pages on loading of pages in the set of memory pages to a random access memory (RAM) of the data processing system for access by the operating system, wherein the RAM is disposed in the data processing system and is used for storing memory pages in operation;
    in response to verification of the integrity, designating one or more of the set of memory pages as trusted pages and, in a page table to be used by the operating system during the access, marking non-trusted pages as paged; and
    in response to the verification of integrity, operating the operating system in a trusted mode of operation;
    in response to the operating system attempting to access one of the non-trusted page while operating in the trusted mode of operation, issuing a page interrupt for the non-trusted page and remapping the set of trusted pages to a portion of the RAM which is inaccessible to the VM during an untrusted mode of operation;
    wherein the page interrupt signals an end of the trusted mode of operation.

7. A data processing system having an operating system, a random access memory (RAM) for storing memory pages to be accessed by the operating system in operation, and a virtual machine controller for protecting the integrity of a set of the memory pages, the virtual machine controller being adapted for:

running the operating system in a virtual machine (VM);

verifying the integrity of the set of memory pages on loading of pages in the set of memory pages to the RAM for access by the operating system;

in response to verification of the integrity, designating one or more of the set of memory pages as a set of trusted pages and, in a page table to be used by the operating system during the access, marking one or more non-trusted pages as paged;

in response to the verification of integrity, operating the operating system in a trusted mode of operation;

in response to the operating system attempting to access one of the non-trusted page while operating in the trusted mode of operation, issuing a page interrupt for the non-trusted page and remapping the set of trusted pages to a portion of the RAM which is inaccessible to the VM during an untrusted mode of operation;

wherein the page interrupt signals an end of the trusted mode of operation.

8. The data processing system of claim 7, wherein the set of memory pages comprises the pages needed to run a predetermined software application on the operating system.

9. The data processing system of claim 7, wherein the virtual machine controller is adapted for:

maintaining a mirror page table corresponding to a system page table maintained by the operating system in operation;

designating the set of memory pages as trusted pages by marking each page in the set as trusted in the mirror page table;

marking non-trusted pages in the mirror page table as paged;

controlling the data processing system such that the mirror page table is used by the operating system during the access; and in response to the page fault interrupt for a non-trusted page, controlling the data processing system such that the operating system reverts to use of the system page table.

10. The data processing system of claim 7, wherein the virtual machine controller is adapted for:

marking the non-trusted pages as paged in response to the verification by setting respective paged flags in a system page table maintained by the operating system in operation; and resetting the paged flags for the non-trusted pages in response to the page fault interrupt for a non-trusted page.

11. The data processing system of claim 7, wherein the virtual machine controller is adapted for verifying the integrity of the set of pages by hashing the pages and comparing the resulting hash value to a predetermined trusted value.

12. The data processing system of claim 7, wherein the virtual machine controller is adapted such that:

in response to initiation of a subsequent access by the operating system to the set of pages, the controller remaps the set of pages to a portion of the RAM which is accessible to the virtual machine, and marks non-trusted pages as paged in the page table to be used by the operating system during the access; and in response to a subsequent page fault interrupt for a non-trusted page, the controller remaps the set of pages to the portion of the RAM which is inaccessible to the virtual machine.

13. The data processing system of claim 7, further comprising a plurality of operating systems, wherein the virtual machine controller is adapted for running each operating system in a respective virtual machine.

* * * * *